United States Patent [19]

Linyaev et al.

[11] Patent Number: 4,757,873

[45] Date of Patent: Jul. 19, 1988

[54] ARTICULATED TRANSDUCER PAD ASSEMBLY FOR ACOUSTIC LOGGING TOOL

[75] Inventors: Eugene J. Linyaev, Houston; Roy E. Swanson, Jr., Sugarland, both of Tex.

[73] Assignee: NL Industries, Inc., New York, N.Y.

[21] Appl. No.: 934,673

[22] Filed: Nov. 25, 1986

[51] Int. Cl.⁴ .............................................. G01V 1/40
[52] U.S. Cl. ....................................... 181/105; 367/35;
    367/911
[58] Field of Search ............................ 367/25, 35, 911;
    181/104, 105; 324/367, 368, 374; 33/178 F

[56] References Cited

U.S. PATENT DOCUMENTS

| | | | |
|---|---|---|---|
| 3,363,719 | 1/1968 | Venghiattis | 367/911 |
| 3,685,158 | 8/1972 | Planche | 33/178 F |
| 3,794,976 | 2/1974 | Mickler | 181/104 |
| 3,900,826 | 8/1975 | Dowling et al. | 367/31 |
| 4,255,798 | 3/1981 | Havira | 181/105 |
| 4,614,250 | 9/1986 | Panetta et al. | 181/105 |
| 4,665,511 | 5/1987 | Rodney et al. | 367/27 |

Primary Examiner—Thomas H. Tarcza
Assistant Examiner—Ian J. Lobo
Attorney, Agent, or Firm—Browning, Bushman, Zamecki & Anderson

[57] ABSTRACT

The present invention is directed to an apparatus useful in downhole logging tools used in the oil and gas industry. The present invention is particularly directed to an acoustic logging tool including improved, articulated transducer pad assemblies for providing improved transducer contact with the wall of a borehole or the inside wall of casing cemented in the borehole. The apparatus of the present invention provides a plurality of articulated transducer pad assemblies disposed about the circumference of an acoustic logging tool in a plurality of separately movable and adjustable groups. These assemblies each include a plurality of articulated joints permitting limited independent movement of each assembly. The assemblies are spring biased at each end into a deployed configuration to maintain good contact with the wall of the borehole or casing. A drive motor overcomes the biasing springs to retract the assemblies to provide a compact tool for tripping to the location of interest within the borehole.

14 Claims, 6 Drawing Sheets

ARTICULATED TRANSDUCER PAD ASSEMBLY FOR ACOUSTIC LOGGING TOOL

BACKGROUND OF THE INVENTION

1. Field of the Invention

The present invention generally relates to an apparatus useful in downhole logging tools used in the oil and gas industry. The present invention is particularly directed to a tool including improved articulated transducer pad assemblies for providing improved transducer contact with the wall of a borehole or the inside wall of casing cemented in the borehole.

2. Description of the Background

Many measurements using acoustic transducers are made in the oil and gas industry in open and cased wells. Logging tools, in particular sondes from which these acoustic transducers are disposed, are passed through a borehole or a completed well to provide valuable information concerning the completed well and the formation through which a borehole has been drilled.

One of the significant uses for such acoustic logging tools is in determining the integrity of the cementing operation. In the oil and gas industry, wells are completed by setting a string of pipe or casing in a borehole and filling the annulus between the pipe or casing and the borehole with cement. This operation separates the various formation zones, and particularly separates the productive oil and gas bearing formations from non-productive formations such as water bearing formations. Once separated by the cementing operation, only the desired oil and gas bearing formations are perforated for production. Failure or incompleteness of the cement bond likely will result in incomplete separation between the various formations. Migration of fluids under pressure through voids or cracks appearing in the cement between the casing and borehole will cause contamination of the fluids of one zone with the fluids of another zone. This contamination is particularly undesirable where fluids from water bearing strata migrate into fluids in a producing zone. This migration typically results in decreased production of hydrocarbon fluids, increased production of non-desirable fluids and contamination of equipment. These results often cause serious financial loss and may even cause a well to become non-commercial.

Accordingly, the desirability of accurately determining the quality of the cement bond between a casing and a wall of a borehole has long been a goal of those associated with the oil and gas industry. A "good bond" produces the desired separation of zones and is achieved with good adhesion, although microfissures or a microannulus may be present.

Many prior systems have been developed for investigating the bond quality between a casing and a borehole wall. Prior systems for inspecting the cement bond of wells in the oil and gas industry have included conventional acoustic cement bond systems employing acoustical transducers in a variety of devices and methods. One such system is described in U.S. Pat. No. 4,255,798 to Havira. Further, the Havira patent lists and describes in columns 2-7 a plurality of patents and articles describing in detail many prior systems for evaluation of cement bond quality using acoustic energy. The Havira patent and its extensive description of these prior systems are incorporated herein by reference.

Each of the prior systems employs an acoustic logging tool having disposed thereon a plurality of acoustic transducers. These transducers are deployed about or from the logging tool by many means both simple and complex. However, there has been a long felt but unfulfilled need within the oil and gas industry for an apparatus for deploying a plurality of acoustic transducers from a central tool to positions about the inside of a casing cemented in a borehole and for providing means whereby each transducer is independently biased about a plurality of axes so that each transducer exhibits an improved contact with the inside wall of the casing.

SUMMARY OF THE INVENTION

The present invention provides a new and improved apparatus useful in downhole logging tools used in the oil and gas industry. The present invention is particularly directed to an improved acoustic logging tool including a plurality of articulated transducer pad assemblies for providing improved transducer contact with the wall of a borehole or the inside wall of casing cemented in the borehole.

The apparatus provides a plurality of articulated transducer pad assemblies disposed about the circumference of an acoustic logging tool. In a presently preferred embodiment, six such assemblies, each assembly including an acoustic transceiver and a longitudinally spaced acoustic receiver, are disposed equidistantly about the tool. In the presently preferred embodiment, three assemblies equidistantly disposed about the acoustic logging tool are operable in a first group while three similar but inverted assemblies also equidistantly disposed about the tool are operable in a second group. Further, each transducer pad assembly includes flexible joints, including articulated hinges, and a knuckle joint to provide flexibility or adjustability for each pad to ensure good pad contact with the wall of the borehole or inside of the casing irrespective of the elipticity or irregularness of the borehole or casing.

The multipad articulated transducer pad assemblies are deployed and retracted by a conventional motor with worm drive for pulling the pad assemblies from the fully deployed portion to the fully retracted position. Biasing means at the top and bottom of each pad assembly urge the pad assemblies toward the fully deployed position. Accordingly, reverse operation of the motor permits the pad assemblies to move to the maximum permissible deployed position or into contact with the borehole wall or casing. When the pads are in the deployed position in a casing or borehole, they are biased into continuous contact with the wall by these independent biasing means. In the presently preferred embodiment, each end of each pad is independently spring loaded toward a deployed configuration to maintain continuous contact with the casing wall. Because each transducer pad assembly is independently biased at each end outwardly toward the wall of the casing or borehole, the transducer pad assemblies are maintained in good contact even in elliptical or irregularly shaped casings and boreholes or where the tool itself has become skewed or eccentric within the casing, such as within directional boreholes.

The apparatus of the present invention provides an acoustic logging tool having a plurality of independently deployed and independently biased, articulated acoustic transducer pad assemblies. An acoustic logging tool in accord with the present invention provides a small diameter tool which may be used in a wide range of borehole sizes. The design of this tool ensures good transducer contact with the casing or borehole wall to provide high quality acoustic logs. Good wall contact permits improved acoustic logs to be obtained with a single tool in boreholes having a wide range of diameters, ellipticities and irregular cross sections. These and other meritorious features and advantages of the present invention will be more fully appreciated from the following detailed description and claims.

BRIEF DESCRIPTION OF THE DRAWINGS

Other features and intended advantages of the present invention will be more readily apparent by the references to the following detailed description in connection with the accompanying drawings, wherein.

While the invention will be described in connection with the presently preferred embodiment, it will be understood that it is not intended to limit the invention to this embodiment. On the contrary, it is intended to cover all alternatives, modifications and equivalents as may be included in the spirit of the invention as defined in the appended claims.

DETAILED DESCRIPTION OF THE PREFERRED EMBODIMENT

The present invention is directed to an apparatus useful in downhole logging tools used in the oil and gas industry. The present invention is particularly directed to an acoustic logging tool including improved, articulated transducer pad assemblies for providing improved transducer contact with the wall of a borehole or the inside wall of casing cemented in the borehole. Further, the present invention provides this improved contact in boreholes of wide ranging diameters and in boreholes having elliptical and irregular cross sections.

Figure 1:
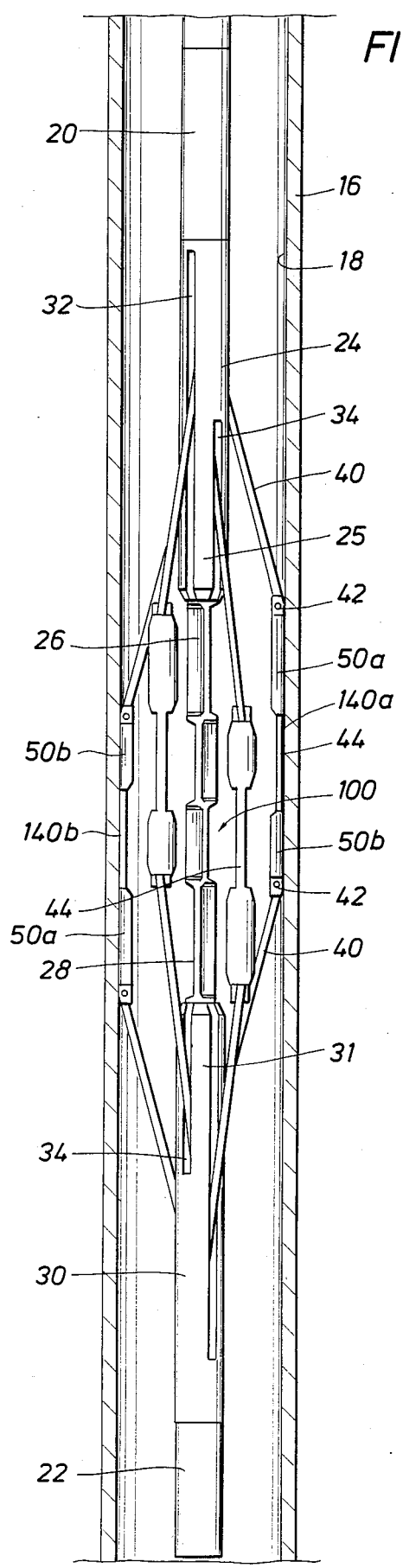
FIG. 1 is a front, perspective illustration of an acoustic logging tool having a plurality of articulated transducer pad assemblies in accord with the present invention with the tool being disposed in a well casing.
Figure 12:
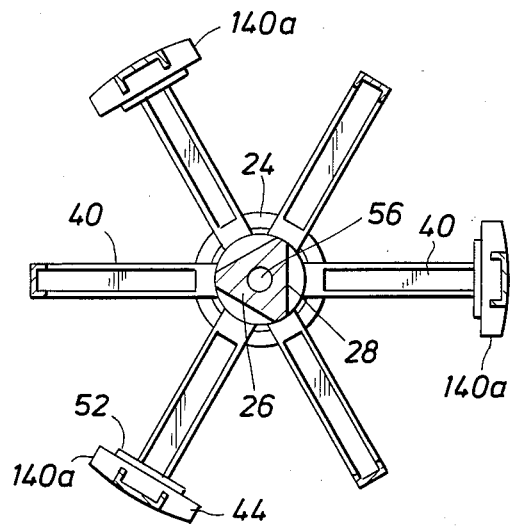
FIG. 12 is a cross-sectional illustration of an acoustic logging tool with articulated transducer pad assemblies in accord with the present invention taken through the line 12—12 of FIG. 11.
Figure 13:
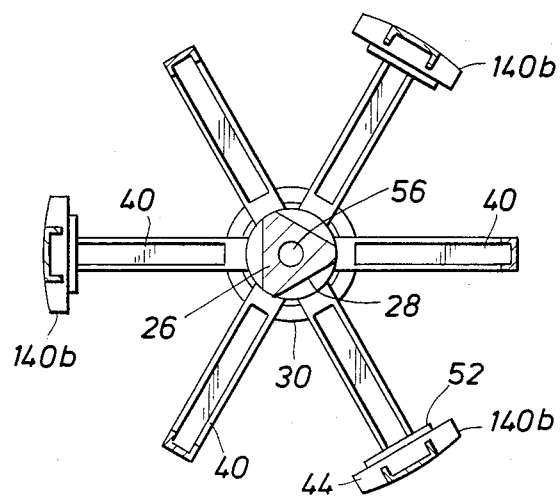
FIG. 13 is a cross-sectional illustration of an acoustic logging tool with articulated transducer pad assemblies in accord with the present invention taken through the line 13—13 of FIG. 11.

FIG. 1 illustrates generally an acoustic logging tool 100 having a plurality of articulated transducer pad assemblies 140 in accord with the present invention. In FIG. 1, tool 100 is illustrated disposed within casing 16 and having assemblies 140 deployed for contact with the interior surface 18 of casing 16.

The major components of tool 100 are illustrated in FIG. 1. In a presently preferred embodiment, tool 100 includes six transducer pad assemblies 140 disposed equidistantly about the periphery of tool 100. The assemblies are disposed in two independently grouped sets, each grouped set having three transducer assemblies 140. The upper grouped set comprises three identical transducer pad assemblies 140a disposed equidistantly about the tool 100. The lower grouped set comprises three more identical transducer pad assemblies 140b also disposed equidistantly about tool 100 and bisecting the angles between the assemblies of the first grouped set. This configuration provides six transducer pad assemblies 140 disposed at intervals of 60° about tool 100. It should be noted that each transducer pad assembly 140 comprises a transducer pad carrier and protector 44 having mounted in an appropriate recess near one end thereof an acoustic transceiver 50a and having mounted in an appropriate recess near the other end thereof an acoustic receiver 50b. In the presently preferred embodiment, transceivers 50a are mounted near the top of upper assemblies 140a and at the bottom of lower assemblies 140b. Receivers 50b are appropriately mounted near the opposite ends of assemblies 140. Hinged with pin 42 at each end of elongated carrier 44 is an arm for articulated deployment of transducer pad carrier 44 from the tool body.

Tool 100 includes near the upper end thereof upper instrument sub 20 in which is disposed electrical connections and instrumentation for data handling and for operation of the acoustic transducers and articulated pad assemblies. Directly below instrument sub 20 and threaded thereto is upper slotted housing 24 terminating at its lower end in a plurality of fingers 25. Each finger is disposed between a long slot 32 and a short slot 34 into which retracted arms 40 attached to upper transducer pad assemblies 140a and lower transducer pad assemblies 140b move, respectively.

To the lower end of upper housing 24 is threaded connector 26 about which are a plurality of recesses for receiving transducer pad assemblies 140 in the retracted position. This configuration produces a compact tool having a small diameter for rapid movement through the borehole to the area of interest and for use in boreholes having a wide range of diameters. Through the center of connector 26 is bore 56 for carrying electrical wires (not shown) to the lower end of tool 100. In order to provide the most compact and yet strongest tool, connector 26 has been machined to provide a plurality of flat, recessed sides 28 for cooperation with the back of each, thick acoustic transducer 50. Accordingly, connector 26 exhibits a generally triangular cross section, the triangularity alternating between a first and second position to accommodate the upper and lower transducer pad assemblies 140a and 140b, respectively. This configuration permits connector 26 to be constructed using the most metal to provide improved strength.

Attached to the lower end of connector 26 is lower slotted housing 30 similar to upper slotted housing 24. Lower housing 30 includes a plurality of fingers 31 separating long slots 32 and short slots 34 as found on upper housing 24. Lower housing 30 is aligned with upper housing 24 so that each long slot 32 on one housing is aligned with a short slot 34 on the other housing to facilitate retraction of arms 40 attached at each end of articulated transducer pad assemblies 140. Connector 26 and lower housing 30 are not threadedly engaged, but are fixed together with a conventional splined joint and held with a plurality of shear pins 110. Accordingly, were tool 100 to become stuck within casing 16, tool 100 would separate at the juncture of connector 26 with lower housing 30. If the lower portions of the tool, including housing 30, became stuck within the casing, pulling on the wireline would result in shearing of shear pin 110 and separation of connector 26 from housing 30. Separation at this joint would cause articulated transducer pad assemblies 140 to collapse as the upper portions of the tool, including housings 20 and 24 and connector 26, were moved away from the stuck lower portions of the tool including lower housing 30. Such collapse is designed to facilitate retrieval of the tool. If the lower portions of the tool remain stuck, continued pulling on the wireline is designed to separate pad assemblies 140 at their lower end from lower housing 30. Accordingly, the upper portions of the tool 100 would be easily pulled from the borehole. Further, the upper end of lower housing 30 still stuck within the casing 16 is designed to provide an easily fishable target for conventional fishing tools.

Finally, threaded to the lower end of housing 30 is lower motor sub 22 wherein is disposed a conventional motor with worm drive for pulling transducer assemblies 140 into their retracted positions recessed within tool 100.

FIGS. 2A-2D and 3-10 illustrate in greater detail the various components of articulated transducer pad assemblies 140 and the various components employed to deploy and retrieve assemblies 140. FIGS. 2A, 2D, 3 and 4 illustrate in detail upper 150 and lower 152 biasing assemblies for upper pad assemblies 140a. Similarly, upper 160 and lower 162 biasing assemblies for lower pad assemblies 140b are illustrated in these figures.

Disposed within the upper end of upper housing 24 is hanger 80 flanged at 78 about its lower end for threaded engagement with upper housing 24. Upper instrument sub 20 includes on its lower end bore 82 for receiving therein the upper end of hanger 80 and is threaded exteriorly for threaded engagement with housing 24 to secure hanger 80 in place. Threaded into and extending from bore 84 in the lower end of hanger 80 is holdup 88 terminating having near its middle flange 90. Adjacent the upper side of flange 90 and threaded on holdup 88 is knuckled washer 86 and flanged washer 68. Flanged washer 68 is freely disposed about the kuckle of washer 86 to provide a degree of free movement about the resulting knuckle joint. The lower end of holdup 88 passes through a bore in the upper end of sleeve 92 and is threadedly engaged to one side of complex nut 94. Nut 94 is maintained within sleeve 92 by spiral pin 118 fit through a cross bore in nut 114 with ends extending into slots 93 in opposite sides of sleeve 92. This permits nut 94 limited longitudinal movement within sleeve 92. Threaded to the other side of complex nut 94 is shaft 76 which passes through a central bore in yoke 74. Concentric with the exterior of sleeve 92 is spring 70 urging sleeve 92 and yoke 74 away from knuckled washer 86 toward a stop against nut 94. This upper biasing assembly 150 works in conjunction with the upper group of transducer pad assemblies 140a.

A second upper biasing assembly 160 of similar construction provides upper biasing for lower transducer pad assemblies 140b. Many of the parts employed in upper biasing assembly 150 are similarly employed in upper biasing assembly 160 and in lower biasing assemblies 152 and 162 and, accordingly, are designated with the same reference numerals.

Threaded to shaft 76 above flange 96 near the lower end of shaft 76 is knuckled washer 86 with flanged washer 68 disposed thereon to produce a knuckle joint as described above. Shaft 76 below flange 96 passes through a bore on the upper end of sleeve 92 and is threaded into one side of complex nut 94 movably held into sleeve 92 by pin 118. Disposed below sleeve 92 is yoke 74. Spring 70 again biases yoke 74 away from knuckled washer 86 as described above.

Figure 2A:
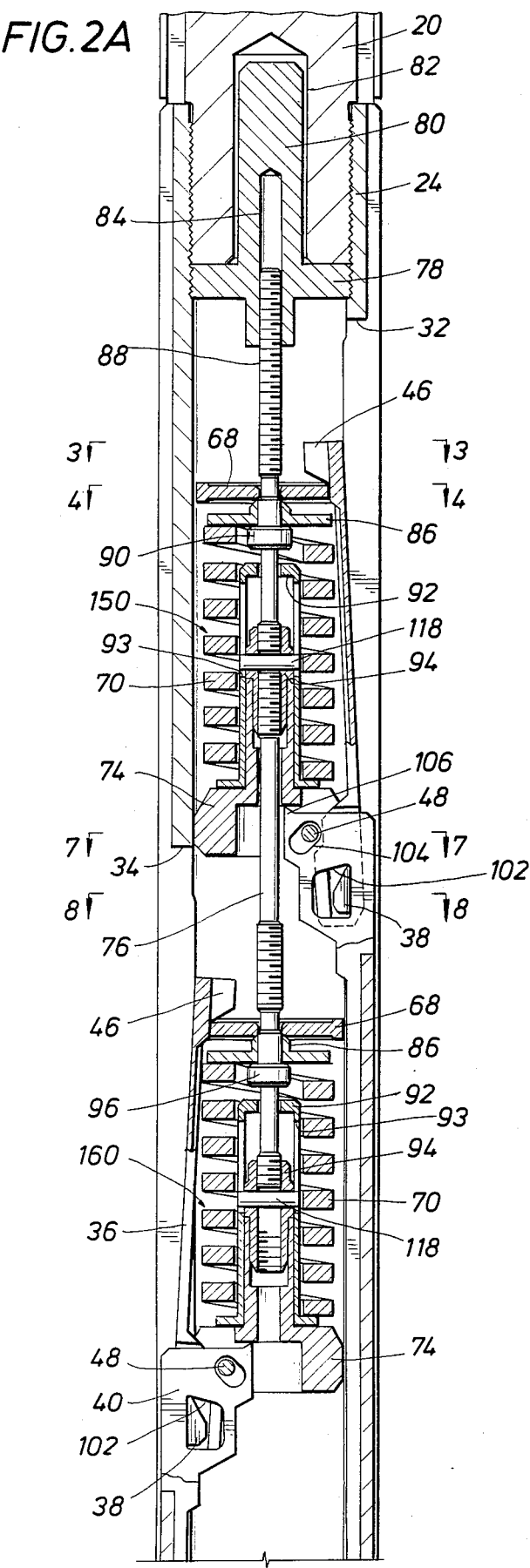
FIGS. 2A-2D are front illustrations in cross section of a portion of an acoustic logging tool including a plurality of articulated transducer pad assemblies in accord with the present invention with the assemblies in the retracted position.
Figure 2B:
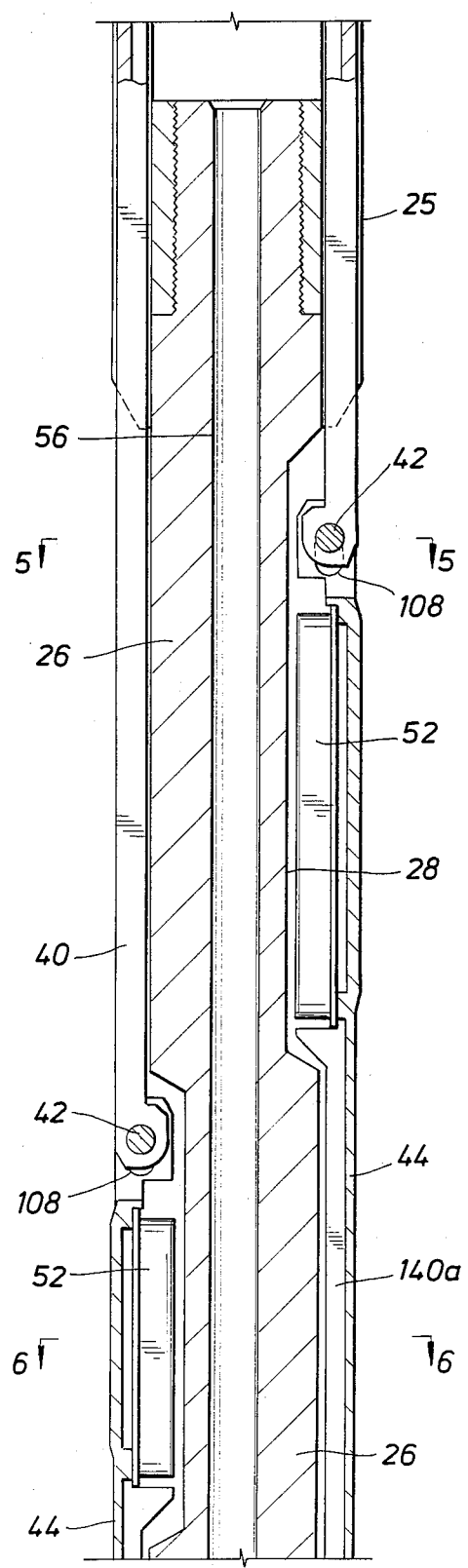
Figure 2C:
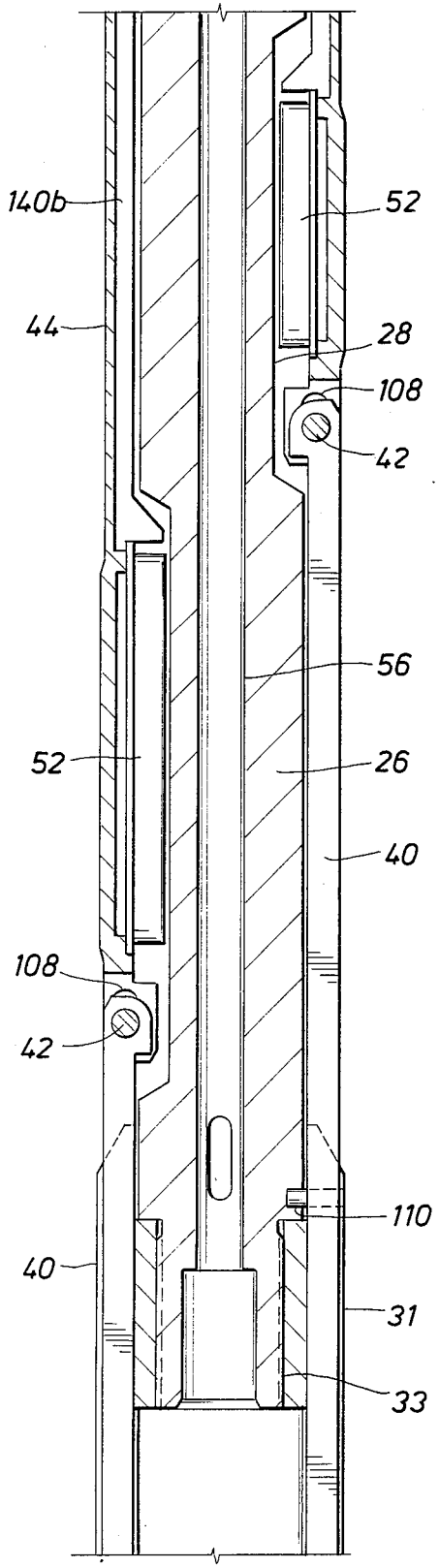
Figure 2D:
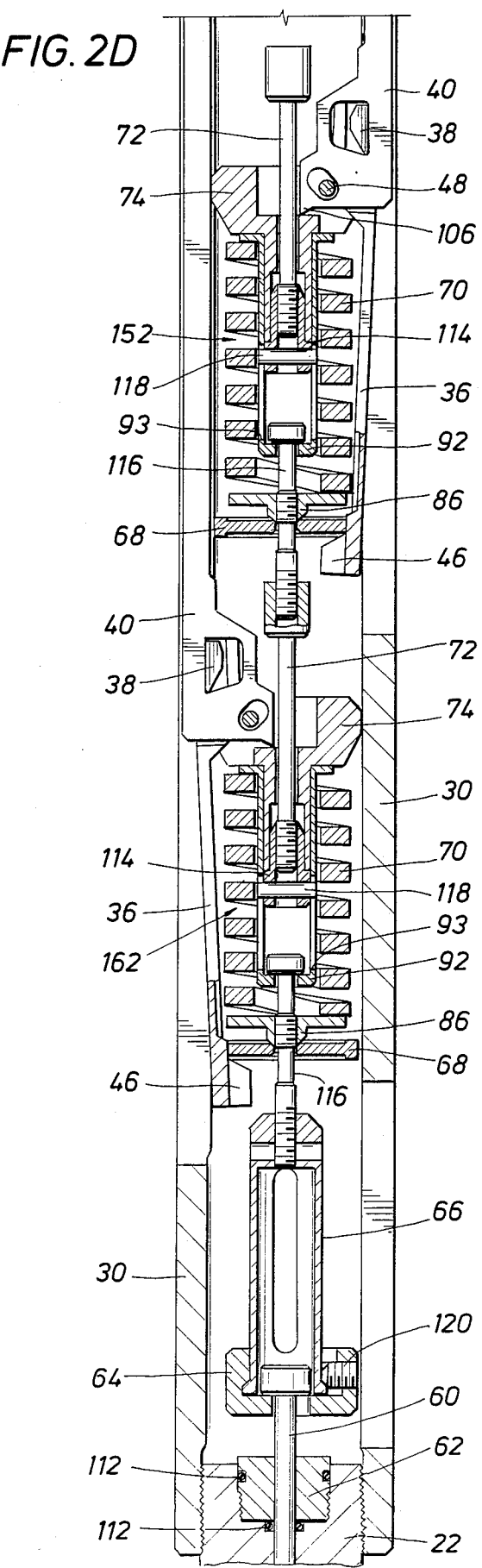
Figure 3:
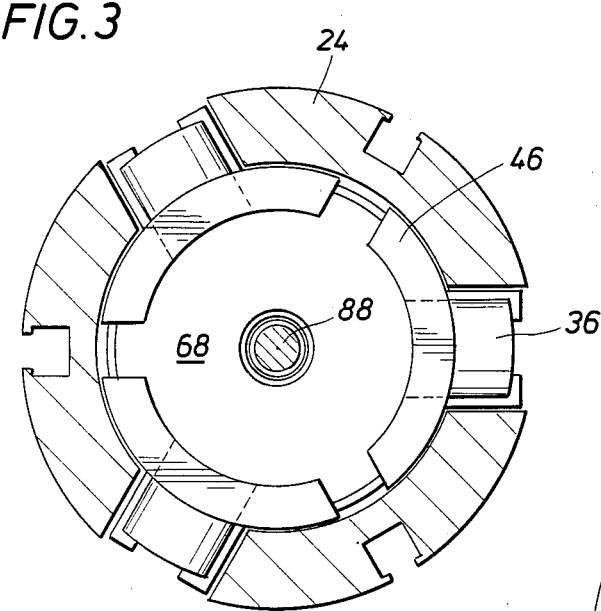
FIG. 3 is a cross-sectional illustration of an acoustic logging tool with articulated transducer pad assemblies in accord with the present invention taken through the line 3—3 of FIG. 2A.
Figure 4:
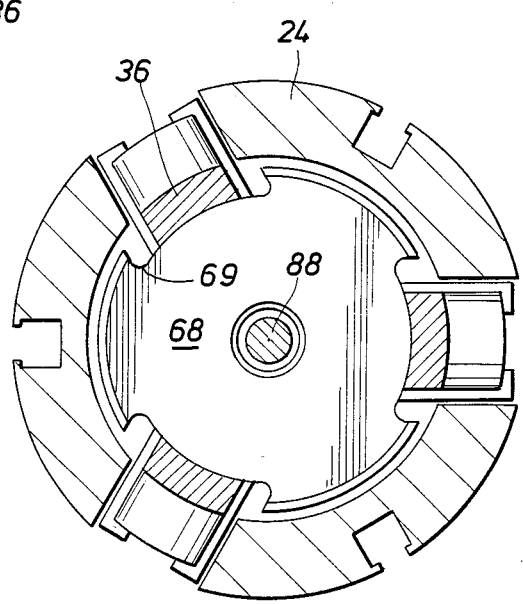
FIG. 4 is a cross-sectional illustration of an acoustic logging tool with articulated transducer pad assemblies in accord with the present invention taken through the line 4—4 of FIG. 2A.
Figure 5:
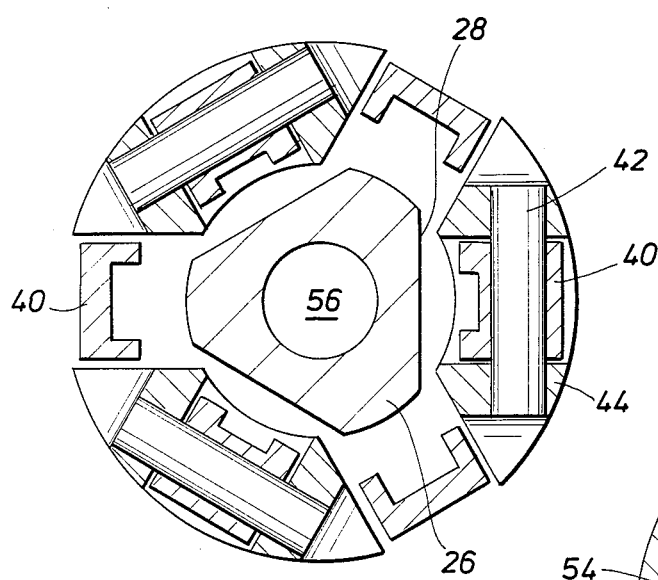
FIG. 5 is a cross-sectional illustration of an acoustic logging tool with articulated transducer pad assemblies in accord with the present invention taken through the line 5—5 of FIG. 2B.
Figure 6:
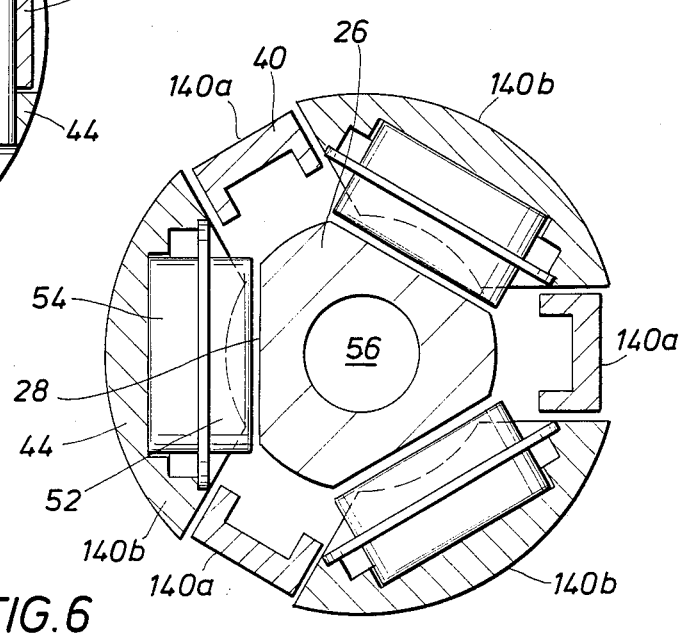
FIG. 6 is a cross-sectional illustration of an acoustic logging tool with articulated transducer pad assemblies in accord with the present invention taken through the line 6—6 of FIG. 2B.
Figure 7:
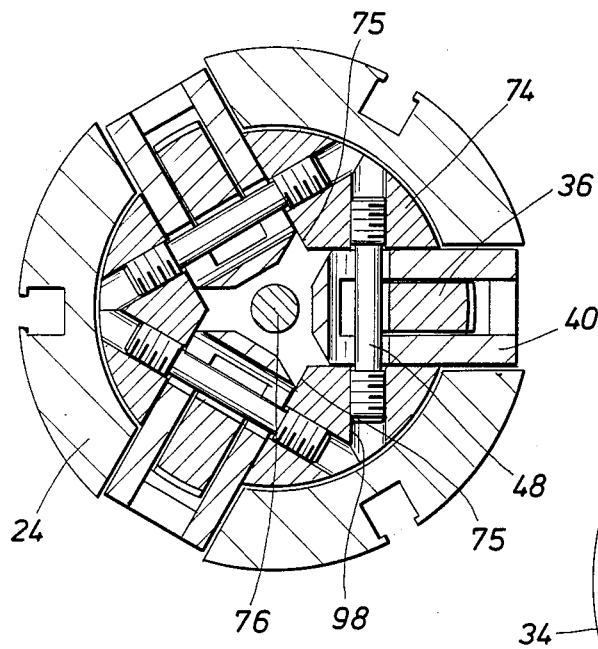
FIG. 7 is a cross-sectional illustration of an acoustic logging tool with articulated transducer pad assemblies in accord with the present invention taken through the line 7—7 of FIG. 2A.
Figure 8:
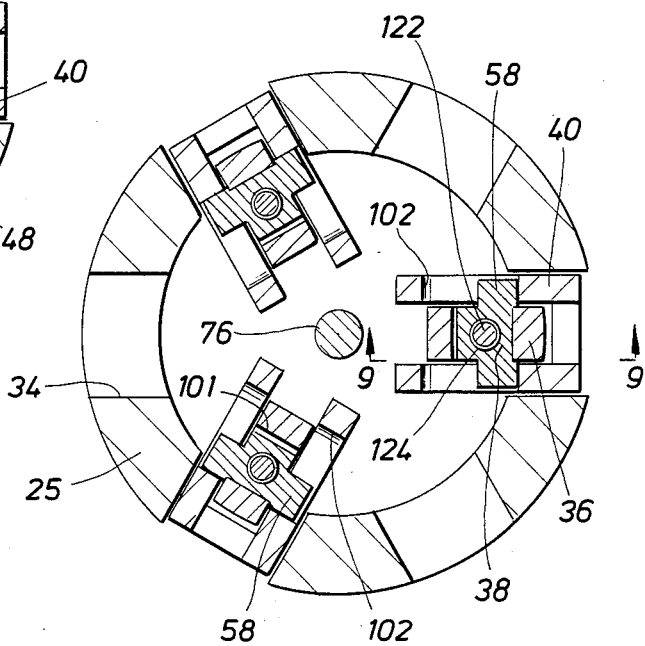
FIG. 8 is a cross-sectional illustration of an acoustic logging tool with articulated transducer pad assemblies in accord with the present invention taken through the line 8—8 of FIG. 2A.
Figure 9:
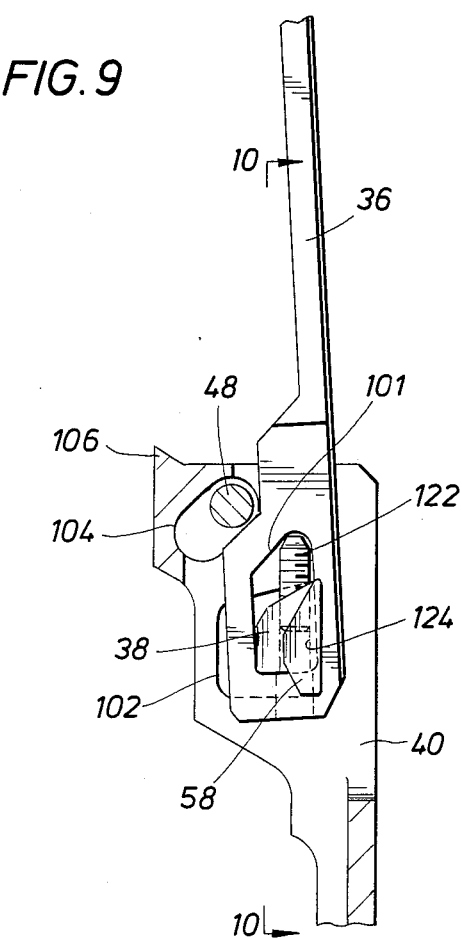
FIG. 9 is a detailed illustration in partial cross section of an articulated hinge joining link 36 and arm 40 of the articulated transducer pad assembly in accord with the present invention as illustrated in FIGS. 2A-2D.
Figure 10:
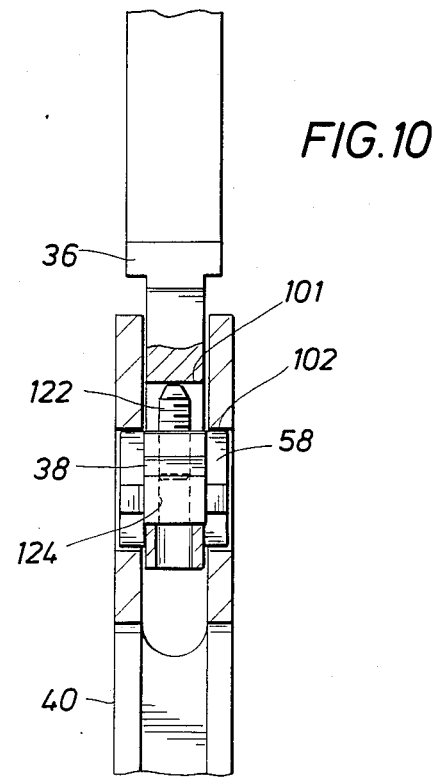
FIG. 10 is a cross-sectional illustration of the articulated hinge illustrated in FIG. 9 and taken through the line 10—10.
Figure 11A:
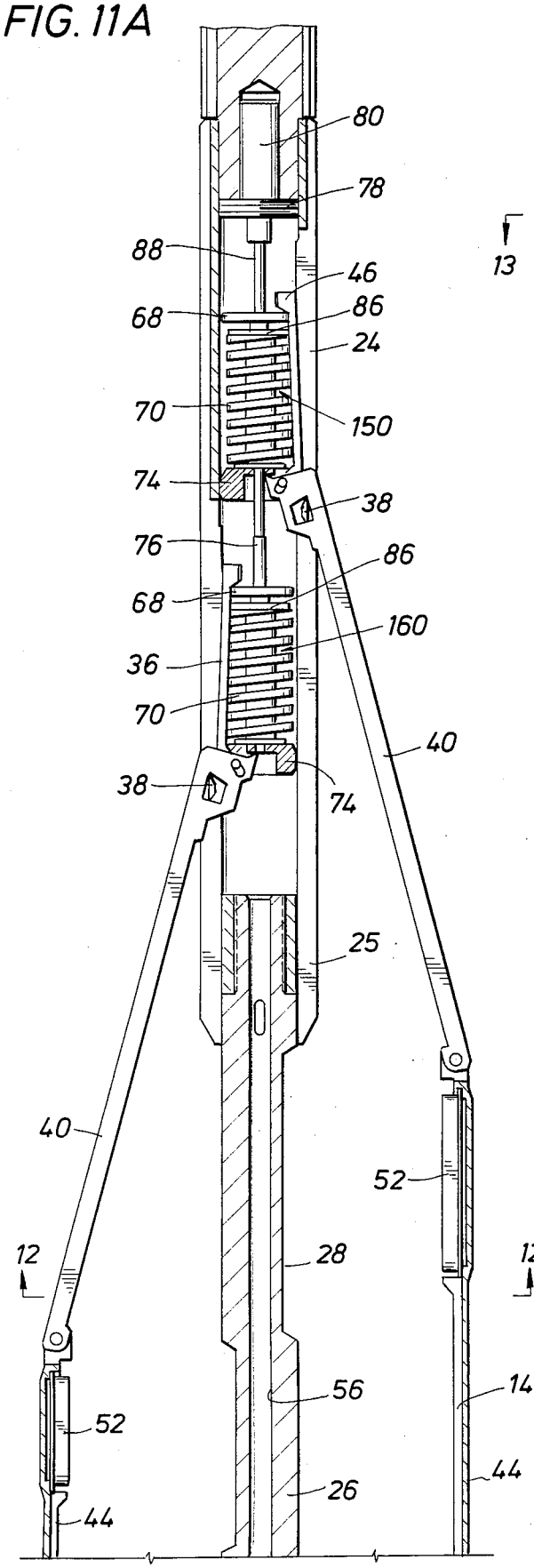
FIGS. 11A-11B are simplified front illustrations in partial cross section of the portion of an acoustic logging tool with articulated transducer pad assemblies in accord with the present invention illustrated in FIGS. 2A-2D with the assemblies in the deployed position.
Figure 11B:
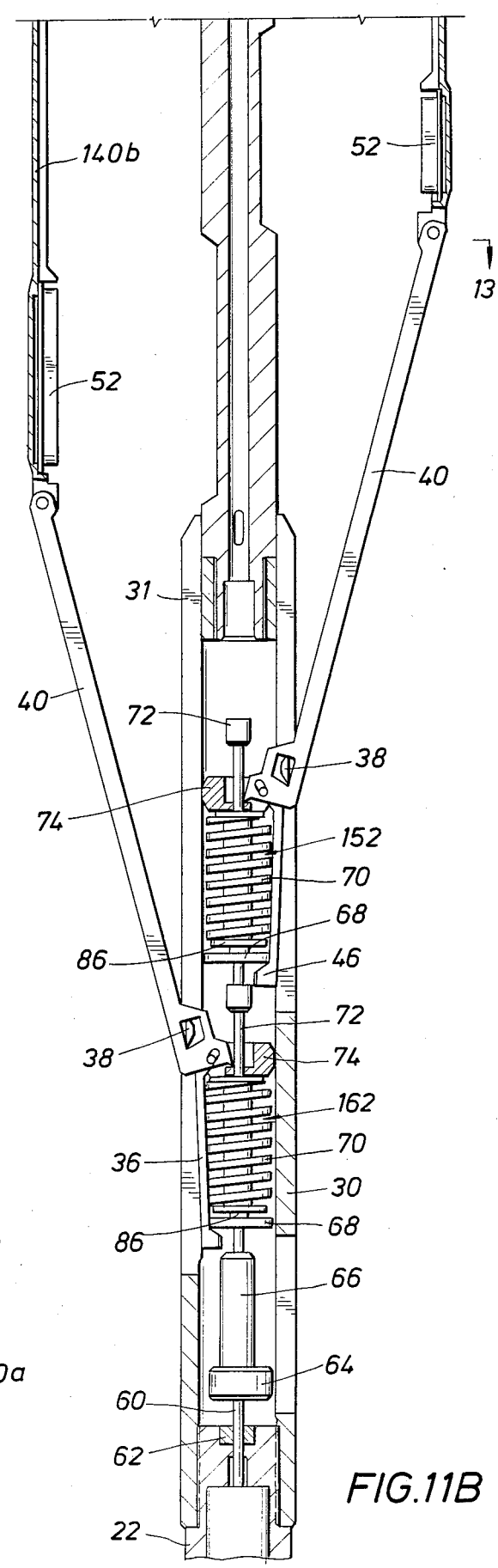

FIG. 2D discloses in detail lower biasing assemblies 152 and 162 for cooperation with upper biasing assemblies 150 and 160, respectively, for operation of the upper and lower transducer pad assemblies 140a and 140b, respectively. It should be noted that lower biasing assemblies 152 and 162 are similar in construction but reversed in position from cooperating upper biasing assemblies 150 and 160.

In biasing assembly 152, stem 72 passes through the central bore of yoke 74 and is threaded at its lower end to nut 114 which is maintained within sleeve 92 by pin 118 extending into slots 93 of sleeve 92. Concentric about the lower portion of yoke 74 and nut 114 is sleeve 92. Bolt 116 passes through a bore in the end of sleeve 92, is threaded through knuckled washer 86 and passes through flanged washer 68 and is threadedly engaged at its lower end in an upset on the end of a second stem 72. Again, spring 70 disposed concentric and exterior of sleeve 92 biases yoke 74 away from knuckled washer 86.

Finally, lowermost biasing assembly 162 is disposed below assembly 152. Again, stem 72 passes through a bore in the center of yoke 74 for threaded engagement at its lower end with nut 114 movably held within sleeve 92 by pin 118. About the lower portion of yoke 74 is disposed concentric sleeve 92. Passing through a bore in the end of sleeve 92 is bolt 116 to which is threaded the center of knuckled washer 86 which passes through flanged washer 68. Again, spring 70 biases yoke 74 away from knuckled washer 86.

At its lower end, lower bolt 116 is threaded to the upper end of slider 66 having a central bore therein permitting free movement of pull rod 60 therethrough.

Pull rod 60 extends from the upper end of a conventional motor and worm drive (not shown) for moving pull rod 60 longitudinally along the axis of tool 100. Pull rod 60 is maintained within the bore of slider 66 by coupler 64 and set screw 120 cooperating with the flanged lower end of slider 66 to maintain the flanged upper end of pull rod 60 within slider 66.

The lower end of housing 30 is engaged to the upper end of motor sub 22 using a conventional threaded coupling. The motor (not shown) in sub 22 is protected at its upper end by seal bushing 62 threaded in the upper end of lower motor sub 22. O-rings 112 are provided about seal bushing 62.

FIGS. 2B, 2C, 5 and 6 illustrate in greater detail the central portions of transducer pad assemblies 140 and connector 26. Passing through the length of connector 26 is bore 56 providing a passage for electrical wiring (not shown) to the bottom of the tool 110. Recesses 28 in the sides of connector 26 accommodate the transducer cannisters 52 to provide a compact tool 100 when assemblies 140 are in the retracted position.

Each transducer pad assembly 140 includes a transducer pad carrier 44 having affixed at a first end an acoustic transceiver 50a and at a second, opposite end an acoustic receiver 50b. Acoustic transceiver 50a and acoustic receiver 50b are each enclosed within a protective cannister 52 and affixed by conventional means, preferably screws, to the inward side of the end portion of carrier 44, preferably within a recess to provide shielded, close contact between the transducer material 54 and the carrier 44. The exterior surface of carrier 44, at least in the area of the transducers 50, is convex for improved contact with the surface of a borehole or the interior surface of a casing.

A lost-motion hinge is provided at the upper and lower ends of pad carrier 44, at least in part, by slots 108 cooperating with hinge pins 42 in circular bores in the ends of arms 40 to provide a sliding, hinge joint. This last-motion hinge configuration permits a degree of freedom in the movement at the hinge between arms 40 and transducer carrier 44 by permitting hinge pin 42 to slide within slot 108 of carrier 44. This sliding movement aids in providing better contact between transducers 50 on carrier 44 and interior 18 of the borehole or casing 16.

FIGS. 2A, 2D, 3 and 4 illustrate in detail link 36 and its cooperation with biasing devices 150, 160, 152 and 162. The complex articulated joint between link 36 and arm 40 is also illustrated in detail in FIGS. 2A, 2D and 7-10. Each arm 40 terminates at its end furthest from transducer carrier 44 in an enlarged end to provide sufficient area for an articulated hinge with link 36. On the end of each arm 40 is a pointed cam 106 for cooperation with yoke 74. The end of arm 40 is inserted within a cooperating cut 75 in the enlarged end of yoke 74 and maintained therein by threaded yoke screw 48 passing through bore 98 across the enlarged end of yoke 74 and through elliptical slot 104 in the end of arm 40.

Also within the enlarged end of arm 40 is irregularly shaped slot 102 for cooperation with slot 101 in the end of link 36 and with complex pivot 38 to hingedly connect link 36 to arm 40. Pivot 38 has a central portion for cooperation with slot 101 in link 36 and two outer wing portions 58 for cooperation with irregular slots 102 on arm 40. When the slots in link 36 and arm 40 are aligned, pivot 38 is inserted into aligned slots 101 and 102 and maintained therein by tightening of set screw 122 placed in bore 124 through the central portion of pivot 38.

Finally, each link 36 terminates at its opposite end in curved flare 46 for cooperation with flange 68. Flange 68 is recessed at 69 to facilitate passage thereby of link 36 within housing 24 or 30.

FIGS. 11A, 11B, 12 and 13 merely illustrate in cross section tool 100 having articulated pad assemblies 140a and 140b deployed as in FIG. 1 but illustrating the major components of the device.

It is readily seen that all of assemblies 140a and 140b are retracted when the worm drive motor (not shown) pulls the pull rod 60 to the lower position as illustrated in FIG. 2D. In this position, the downward closing force provided by the motor is transmitted through pull rod 60 and slider 66 to bolt 116, sleeve 92, pin 118, nut 114, stem 72 of biasing assembly 162 and through the similar parts of biasing assembly 152 to lower links 36 and arms 40 in order to pull carriers 44 downward and inward. Similarly, the forces are transmitted through upper arms 40 and links 36 to upper assemblies 160 and 150 anchored in hanger 80 resulting in retraction of all articulated transducer pad assemblies 140a and 140b.

The device is opened by operating worm drive motor (not shown) to move pull rod 60 to its upper maximum position allows springs 70 to force the articulated pad assemblies 140a and 140b to their maximum permissible deployment. Where tool 100 is disposed within a casing 16 or borehole which prevents assemblies 140a and 140b from reaching maximum deployment, springs 70 maintain the assemblies 140a and 140b in the maximum permissible deployment. Accordingly, it is seen that each assembly 140a or 140b is biased at each end by an equivalent biasing assembly, biasing assemblies 150 and 152 acting on assemblies 140a and biasing assemblies 160 and 162 acting on assemblies 140b, to maintain equal pressure at each end of transducer carrier 44 to maintain the exterior surface of transducer carrier 44 in continuous contact with the borehole wall or interior of the casing. Further, the knuckle joint provided by flanged washer 68 and knuckled washer 86 permits tipping of washer 68 about the knuckle of knuckled washer 86 in response to uneven pressure applied by flares 46 on the ends of links 36. Such movement, together with the movement permitted by the articulated, lost-motion hinge formed by sliding slots 101, 102 and 104 and separate sliding slot 108 permits continuous minor adjustment, within the limits of the lost-motion hinge, of the positioning of individual assemblies 140a and 140b to maintain good transducer contact with the wall of the casing or borehole.

The foregoing description of the invention has been directed in primary part to a particular preferred embodiment in accordance with the requirements of the patent statutes and for purposes of explanation and illustration. It will be apparent, however, to those skilled in the art that many modifications and changes in the specifically described apparatus may be made without departing from the scope and spirit of the invention. For example, Applicants have illustrated and described a device and method employing two sets of transducer assemblies, each set employing three equally spaced assemblies. Applicants believe this provides an optimized configuration. However, those skilled in the art will appreciate that other configurations having the described characteristics may produce the same results. For example, each set of transducer assemblies could include any desired number of assemblies and more than two sets could be employed. Specifically, two set employing four assemblies each could be provided or three sets employing three assemblies each could be provided. However, those skilled in the art would be aware that space limitations within downhole logging tools may limit the number of such assemblies practically deployable in a given tool. Therefore, the invention is not restricted to the particular form of construction and method illustrated and described, but covers all modifications which may fall within the scope of the following claims.

It is Applicants' intention in the following claims to cover such modifications and variations as fall within the true spirit and scope of the invention.

What is claimed is:

1. An acoustic logging tool for use in logging open and cased wells in the oil and gas industry, comprising:
    an elongated sonde for passing through a borehole, the upper end of said sonde including means for attaching said sonde to a wireline;
    a plurality of deployable, acoustic transducer pad assemblies disposed about the periphery of said sonde in a plurality of independently deployable sets, each set comprising at least two said assemblies, each transducer pad assembly comprising,
        a deployable pad having an exterior surface designed for contact with the interior surface of said borehole or a casing cemented therein;
        at least one acoustic transducer mounted on said pad;
        a first, articulated, lost-motion hinge attaching the top of said pad to said sonde and a second, articulated, lost-motion hinge attaching the bottom of said pad to said sonde, said lost-motion hinges employed for deploying and retracting said pad from said sonde while permitting limited movement of said pad independent of said other pads in response to irregularities of said interior surface; and
        first biasing means disposed in said sonde for biasing said top of said pad and second biasing means disposed in said sonde for biasing said bottom of said pad, said first and second biasing means acting through said hinges to bias said pad outward from said sonde; and
    drive means in said sonde for overcoming said biasing means to move said transducer pad assemblies to fully retracted positions.

2. The acoustic logging tool of claim 1 wherein each said hinge comprises an arm hingedly connected at a first end to said pad with a first, lost-motion, sliding pivot and hingedly connected at a second end to said sonde with a second, lost-motion, sliding pivot.

3. The acoustic logging tool of claim 2 wherein each said hinge further comprises a link biased at a first end by one of said biasing means and connected at a second end with a complex pivot to said second end of said arm for biasing said pad outward from said sonde.

4. The acoustic logging tool of claim 3 wherein the tops of all transducer pad assemblies in each said set are biased by a single, first biasing means and wherein the bottoms of all said transducer pad assemblies in each set are biased by a single, second biasing means.

5. The acoustic logging tool of claim 4 wherein said first and second biasing means each comprise a spring biasing means.

6. The acoustic logging tool of claim 5 wherein said biasing means further comprises a knuckle joint between each said spring and said transducer pad assemblies.

7. The acoustic logging tool of claim 6 comprising two said sets of transducer pad assemblies, each said set comprising three transducer pad assemblies, all said transducer pad assemblies and all said assemblies within each said set being distributed equidistantly about the periphery of said sonde.

8. The acoustic logging tool of claim 7 wherein each said transducer pad assembly includes a plurality of acoustic transducers.

9. The acoustic logging tool of claim 8 wherein each said transducer pad assembly includes an acoustic transceiver and an acoustic receiver disposed longitudinally therefrom along said pad assembly.

10. In a logging tool for use in logging open and cased wells in the oil and gas industry, said tool comprising an elongated body for passing through a borehole or casing, a plurality of deployable sensor assemblies disposed about the periphery of said body, each assembly having a sensor mounted on the surface of said assembly, each assembly having a first articulated hinge connecting the top of said assembly to said body and a second articulated hinge connecting the bottom of said assembly to said body for deploying and retracting said assembly from said body, each assembly having first and second biasing means acting through said first and second, articulated hinges for biasing the top and bottom of said assembly outward from said body and drive means in said body for overcoming said biasing means to move said assemblies to fully retracted positions, an improved, articulated hinge comprising:
    a first articulated, lost-motion hinge attaching the top of said pad to said body and a second, articulated, lost-motion hinge attaching the bottom of said pad to said body, said lost-motion hinges employed for deploying and retracting said assembly from said body while permitting limited movement of said assembly independent of said other assemblies in response to irregularites of the interior surface of said borehole or casing.

11. The improved, articulated hinge of claim 10 wherein each said hinge comprises an arm hingedly connected at a first end to said assembly with a first, lost-motion, sliding pivot and hingedly connected at a second end to said body with a second, lost-motion, sliding pivot.

12. The improved, articulated hinge of claim 11 wherein each said hinge further comprises a link biased at a first end by one of said biasing means and connected at a second end with a complex pivot to said second end of said arm for biasing said assembly outward from said body.

13. The improved, articulated hinge of claim 12 wherein said first and second biasing means each comprises a spring biasing means.

14. The improved, articulated hinge of claim 13 wherein each said biasing means further comprises a knuckle joint between each said spring and each said link.

* * * * *